United States Patent
Khojastepour et al.

(10) Patent No.: US 12,335,899 B2
(45) Date of Patent: Jun. 17, 2025

(54) SIMULTANEOUS LOCALIZATION AND SYNCHRONIZATION ACROSS MULTIPLE ANTENNAS

(71) Applicant: NEC Laboratories America, Inc., Princeton, NJ (US)

(72) Inventors: Mohammad Khojastepour, Lawrenceville, NJ (US); Ramanujan Sheshadri, Jersey City, NJ (US); Md. Shaifur Rahman, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 526 days.

(21) Appl. No.: 17/857,626

(22) Filed: Jul. 5, 2022

(65) Prior Publication Data
US 2023/0026160 A1    Jan. 26, 2023

Related U.S. Application Data

(60) Provisional application No. 63/218,590, filed on Jul. 6, 2021.

(51) Int. Cl.
*H04W 64/00* (2009.01)
*H04L 43/0864* (2022.01)

(52) U.S. Cl.
CPC ......... *H04W 64/00* (2013.01); *H04L 43/0864* (2013.01)

(58) Field of Classification Search
CPC ... H04W 4/029; H04W 64/00; H04W 64/003; H04W 4/023; H04W 56/0065; H04L 43/0864; G01S 19/42; G01S 5/00
See application file for complete search history.

(56) References Cited

U.S. PATENT DOCUMENTS

| | | | |
|---|---|---|---|
| 11,656,316 B2 * | 5/2023 | Goff | G01S 5/0247 342/463 |
| 2013/0005348 A1 * | 1/2013 | Sanders | G01S 5/12 455/456.1 |

(Continued)

FOREIGN PATENT DOCUMENTS

WO    WO-2020005082 A1 *   1/2020

OTHER PUBLICATIONS

Krishnan et al., "A UWB based Localization System for Indoor Robot Navigation", In2007 IEEE International Conference on Ultra-Wideband, Sep. 24, 2007, pp. 77-82.

(Continued)

*Primary Examiner* — Allahyar Kasraian
(74) *Attorney, Agent, or Firm* — Joseph Kolodka

(57) ABSTRACT

A computer-implemented method for identifying a device position is provided. The method includes synchronizing a clock between a first device and a second device to obtain a synchronized clock. The method further includes measuring a round-trip time of flight between an antenna from the first device and an antenna from the second device based on the synchronized clock. The method also includes estimating a relative angular position of the second device with respect to the first device based on the round-trip time of flight. The method additionally includes estimating a distance between the first device and the second device based on estimated round-trip time of flight. The method further includes estimating, by the first device, a position of the second device with respect to a known coordinate based on the relative angular position and the distance.

19 Claims, 7 Drawing Sheets

(56) References Cited

U.S. PATENT DOCUMENTS

2017/0055334 A1* 2/2017 Pandharipande ....... H04W 4/33
2019/0088131 A1* 3/2019 Bushnell ................ G08G 1/161
2020/0403652 A1* 12/2020 Goff ...................... H04J 3/0617
2021/0080560 A1* 3/2021 Sharp .................... G01S 5/0081
2021/0124375 A1* 4/2021 Li ........................... G08G 5/34

OTHER PUBLICATIONS

Ye et al., "High-Precision Indoor UWB Localization: Technical Challenges and Method", In2010 IEEE International Conference on Ultra-Wideband, Sep. 20, 2010, vol. 2, pp. 1-4.

Lee et al., "Simultaneous Localization, Mapping, and Deblurring", In2011 International Conference on Computer Vision, Nov. 6, 2011, pp. 1203-1210.

* cited by examiner

SIMULTANEOUS LOCALIZATION AND SYNCHRONIZATION ACROSS MULTIPLE ANTENNAS

RELATED APPLICATION INFORMATION

This application claims priority to U.S. Provisional Patent Application No. 63/218,590, filed on Jul. 6, 2021, incorporated herein by reference in its entirety.

BACKGROUND

Technical Field

The present invention relates to cellular communications and more particularly to simultaneous localization and synchronization across multiple antennas.

Description of the Related Art

In cellular communications, methods for simultaneous localization and synchronization across multiple antennas are required for efficient communications between cellular devices such as mobile smartphones

SUMMARY

According to aspects of the present invention, a computer-implemented method for identifying a device position is provided. The method includes synchronizing a clock between a first device and a second device to obtain a synchronized clock. The method further includes measuring a round-trip time of flight between an antenna from the first device and an antenna from the second device based on the synchronized clock. The method also includes estimating a relative angular position of the second device with respect to the first device based on the round-trip time of flight. The method additionally includes estimating a distance between the first device and the second device based on estimated round-trip time of flight. The method further includes estimating, by the first device, a position of the second device with respect to a known coordinate based on the relative angular position and the distance.

According to other aspects of the present invention, a method of deploying resources in an interior space is provided. The method includes identifying a plurality of device positions within an interior space by fusing estimated distance information and estimated angular orientation from a plurality of devices to determine relative locations between the plurality of devices. The method further includes orienting the relative locations to a fixed anchor node. The method also includes estimating elevation for the plurality of devices relative to the fixed anchor node. The method additionally includes generating a map of the interior space with the device positions responsive to the elevation and relative locations. The method further includes deploying resources to the interior space based on the map.

According to still other aspects of the present invention, a system for identifying device positions is provided. The system includes a hardware processor. The system further includes a memory that stores a computer program which, when executed by the hardware processor, causes the hardware processor to synchronize a clock between a first device and a second device to obtain a synchronized clock, measure a round-trip time of flight between an antenna from the first device and an antenna from the second device based on the synchronized clock, estimate a relative angular position of the second device with respect to the first device based on the round-trip time of flight, estimate a distance between the first device and the second device based on estimated round-trip time of flight, and estimate, by the first device, a position of the second device with respect to a known coordinate based on the relative angular position and the distance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to simultaneous localization and synchronization across multiple antennas.

The present invention provides various methods and systems for device localization and synchronization.

Figure 1:
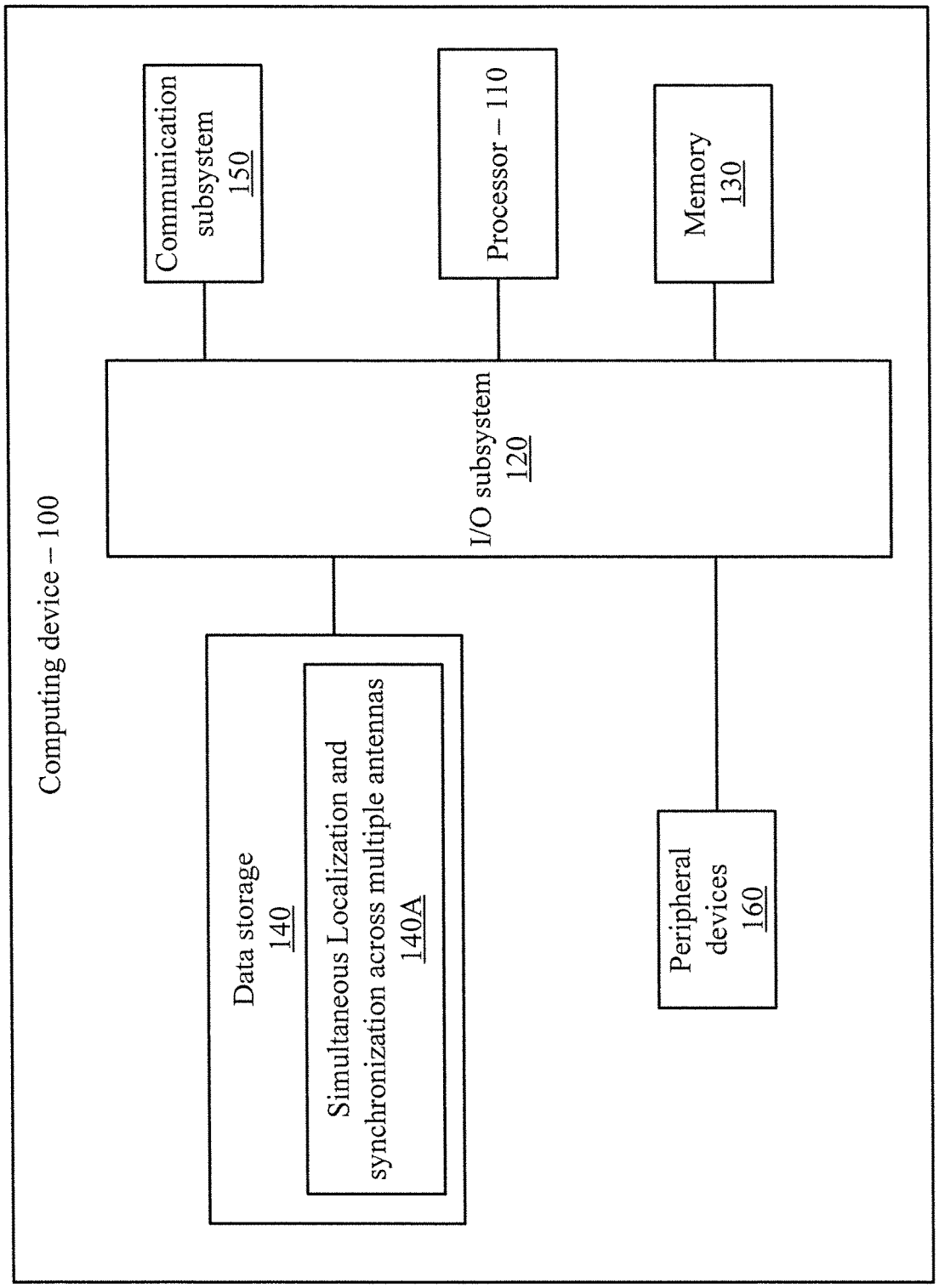
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform simultaneous localization and synchronization across multiple antennas. The computing device 100 can be any of devices 106 in FIG. 6 and/or controller 702 in FIG. 7.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for simultaneous localization and synchronization across multiple antennas. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention The present invention considers the synchronization of the clocks across multiple antenna systems where node i is equipped with $n_i$ antennas for which their RF chain is sharing the same clock. In such a case, it is said that the antennas are a node and that the antennas are synchronized, even though it is understood that the antennas possible have a constant phase offset (or equivalently time offset), hence such offsets may be evaluated a priori and is taken into account in calculations. For the sake of simplification of the notation, it is presumed that such time offsets are zero.

Consider two nodes 1 and 2 where the synchronization process includes transmitting a sequence of one or more packets between them and calculating the time offset between the nodes based on the transmitted and received packets including their information contents and their time stamps. The packet transmitted from the antenna j of node i is denoted by $P_j^i[k](\tilde{t}_j^i[k])$ where k is the packet index and $\tilde{t}_j^i[k]$ is the scheduled time of the packet. Herein, the approximate or estimated value of a value v is represented by $\tilde{v}$. Let $t_j^i[k]$ indicate the actual time stamp of the transmitted packet which might differ from the scheduled time $\tilde{t}_j^i[k]$, e.g., by a few millisecond or picoseconds. It is noted that the actual transmitted time stamp is going to be available after the transmission of the packet. Hence, while the scheduled time stamp may be part of the information content of the packet, the actual transmit time stamp can be sent in the future packets. Similarly, the time stamp of the received packet k when it is received by the antenna j of node i is denoted by $s_j^i[k]$.

A description will now be given regarding known delayer response time, according to an embodiment of the present invention.

Consider the case that node 1 transmits packet $P_1^1[1]$ from its first antenna in round (or packet time) 1. The node 2 receives it, say from antenna 1, at local time $s_1^1[1]$ and responds to it after a known delay $\tau_1$ with a packet $P_1^2[2]$ which includes the information about the known delay $\tau_1$ (if it is not agreed a priori between node 1 and node 2) as well as the time stamp of the received packet 1. We denote the relation between the packet content and the packet by $\{\tau_1, s_1^1[1]\} \subset p_1^2[2]$. The second packet is then received by the node 1 at antenna j at time $s_j^1[2]$ where at this point the true transmit time stamp $t_1^1[1]$ is known. Let rtt(i, j)→(k, l) denote the round trip time between the antenna j of node i and the antenna 1 of node k. If the error in the schedule time of the packet 2 is ignored, which effectively changed the delay value $\tau_1$, the node 1 can calculate the propagation round trip time of the packet 1 and 2 as $\tilde{rtt}((1,1)→(2,1)) = s_1[2] - t_1^1[1] - \tau_1$ Hence, the propagation time is $\tilde{rtt}((1,1)→(2,1))/2$. The timing advance of antenna 1 of node 2 with respect to antenna 1 of node 1 is given by $\tilde{ta}((1,1)(2,1)) = s_1^2[1] - (t_1^1[1] + (\tilde{rtt})→(2,1))/2))$ which is known to node 1.

Hence, after round 2, the node 1 knows the approximate propagation round trip tie and the approximate value of the timing advance. Similar procedure may be performed by sending the packet 3 from node 1 in the same way that the packet 2 was transmitted from node 2. Hence, by the end of the round 3, node 2 also knows both the round trip times and the timing advance between the antenna 1 of the node 1 and 2.

Alternatively, packet 3 may include the approximate value of the timing advance and the approximate propagation round trip time between the antenna 1 of node 1 and node 2.

A description will now be given regarding arbitrary delayed response time, in accordance with an embodiment of the present invention.

Slight modification to the above procedure brings the following advantages: (1) the precision of the calculated value is increased, (ii) there is no need for known delay value, and (iii) in multi-antenna case, only the first two rounds need to be exchanged between similar antennas, say antenna 1 of node 1 and node 2, and there is no need to transmit the third round packet from the same antennas.

In this case, instead of assuming a known delay or sending the delay value in the payloads of the packets, the actual transmit and receive time stamps $t_1^1[1]$ and $s_1^1[2]$ in the payload of the packet $P_1^1[3]$. In this case, the precise value of the round trip time can be calculated by the node 2 as $rtt((1,1)→(2,1)) = s_1^1[2] - t_1^1[1] - (t_1^2[2] - s_1^2[1])$ and the exact value of timing advance would also be known as $ta((1,1)→(2,1)) = s_1 2[1] - t_1^1[1]$.

Hence, after round 3, the node 2 knows both of the precise values of the round trip time and the timing advance. In order to reach the same precision at node 1, the round 4 is necessary where the fourth packet is built similar to that of round 3 and transmitted from node 2 to node 1.

A description will now be given regarding a MIMO extension, in accordance with an embodiment of the present invention.

t is noted that the antenna 1 in the transmission of $t_1^1[1]$ and $s_1^1[2]$ in the payload of the packet $P_1^1[3]$, denoted by $\{t_1^1 [1], s_1^1[2]\} \subset P_1^1[3]$, can be replaced by any other antenna without affecting the calculation of the timing advance and the round trip time between the antenna 1 of the node 1 and antenna 1 of node 2. However, by transmitting from a different antenna, more information can be gathered about the round trip time between different pair of antennas.

In the following, an exemplary case is discussed with two nodes equipped with 3 antennas each as follows:

Round 1: Node 1 sends: $P_1^1[1]$ including $\{\tilde{t}_1^1[1]\}$.
Round 1: Node 2 receives: $P_1^1[1]$ at antenna i, $1 \leq i \leq 3$ at time $s_i^2[1]$.
Round 2: Node 2 sends: $P_1^2[2]$ including $\{\tilde{t}_1^2[2], \{s_1^2[2]\}_{i=1}^3\}$.
Round 2: Node 1 receives: $P_1^2[2]$ at antenna i, $1 \leq i \geq 3$ at time $s_i^1[2]$.
Round 3: Node 1 sends: $P_2^1[3]$ including $\{\tilde{t}_2^1[3], t_1^1[1], \{s_i^1[2]\}_{i=1}^3\}$.
Round 3: Node 2 receives $P_2^1[3]$ at antenna i, $1 \leq i \leq 3$ at time $s_i^2[3]$.
Round 4: Node 2 sends: $P_2^2[4]$ including $\{\tilde{t}_2^2[4], t_1^2[2], \{s_i^2[3]\}_{i=1}^3\}$.
Round 4: Node 1 receives: $P_2^2[4]$ at antenna i, $1 \leq i \leq 3$ at time $s_i^1[4]$.
Round 5: Node 1 sends: $P_3^1[5]$ including $\{\tilde{t}_3^1[5], t_2^1[3], \{s_i^1[4]\}_{i=1}^3\}$.
Round 5: Node 2 receives: $P_3^1[5]$ at antenna i, $1 \leq i \leq 3$ at time $s_i^2[5]$.
Round 6: Node 2 sends: $P_3^2[6]$ including $\{\tilde{t}_3^2[6], t_2^2[5], \{s_i^2[5]\}_{i=1}^3\}$.
Round 6: Node 1 receives: $P_3^2[6]$ at antenna i, $1 \leq i \leq 3$ at time $s_i^1[6]$.

Two notes are in order here. First, it is noted that depending on the procedure of finding the timing advance and the propagation times between the pair of antennas, it is possible to use a smaller subset of the parameters indicated above as the payload of each packet. Second, it is possible to use some form of differential encoding of the parameters in order to reduce the size of the payload. For example, each time stamp may be indicated by b bits, say b=40. However, the difference between some time stamps may require a much smaller number of bits. Particularly, given that $\tilde{t}_1^1[1]$ is sent previously, the value of $t_1^1[1]$ may be indicated by $t_1^1[1] - \tilde{t}_1^1[1]$ which requires only a few bits, e.g., six bits. Hereinafter, a summarization is provided of what is known by the end of each round at each node.

By the end of round 2, Node 1 can calculate:

$$\tilde{rtt}((1,1)→(2,1)) = s_1^1[2] - t_1^1[1] - (\tilde{t}_1^2[2] - s_1^2[1]) \quad (1)$$

$$\tilde{ta}((1,1)→(2,1)) = s_1^2[1] - (t_1^1[1] + \tilde{rtt}((1,1)→(2,1))/2 \quad (2)$$

$$\tilde{rtt}((1,1)→(2,i)) = 2(s_i^2[1] - (t_1^1[1] + \tilde{ta}((1,1)→(2,1)))), i=2,3 \quad (3)$$

By the end of round 3: Node 2 can calculate the following in addition to all other calculations up to the end of round 2:

$$rtt(1,1)→(2,1)) = s_1^1[2] - t_1^1[1] - (t_1^2[2] - s_1^2[1] \quad (4)$$

$$ta((1,1)→(2,1)) = s_1^2[1] - (t_1^1[1] + rtt((\mathbf{1,1})→(2,1))/2) \quad (5)$$

$$rtt(1,1)→(2,i)) = 2(s_i^2[1] - (t_1^1[1] + ta(1,1)→(2,1)))),$$
$$i=2,3 \quad (6)$$

$$rtt((2,1) \to (1,i))=2((s_i^1[2]+ta((1,1) \to (2,1)))-T_1^2[2], \\ i=1,2,3 \quad (7)$$

$$\tilde{rtt}((1,2) \to (2,i))=2(s_i^2[3]-(\tilde{t}_2^{\,1}[3]+ta((1,1) \to (2,1)))), \\ i=1,2,3 \quad (8)$$

It is to be noted that in the last two equations, the value of the round trip time for i=1 provides a secondary estimation of the value of the parameters that had other estimators already.

By the end of round 4: Node 2 can calculate the following in addition to all other calculations up to the end of round 3:

$$rtt((1,2) \to (2,i))=2(s_i^2[3]-(t_2^{\,1}[3]+ta(1,1) \to (2,1)))), \\ i=1,2,3 \quad (9)$$

$$\tilde{rtt}((2,2) \to (1,i))=2((s_i^{\,1}[4]+ta((1,1) \to (2,1)-\tilde{t}_2^{\,2}[4]))), \\ i=1,2,3 \quad (10)$$

By the end of round 5: Node 1 can calculate the following in addition to all other calculations up to the end of round 4:

$$rtt((2,2) \to (1,i))=2((s_i^{\,1}[4]+ta((1,1) \to (2,1))-t_2^{\,2}[4]))), \\ i=1,2,3 \quad (11)$$

$$\tilde{rtt}((1,3) \to (2,i))=2(s_i^2[5]-(\tilde{t}_3^{\,1}[5]+ta((1,1) \to (2,1)))), \\ i=1,2,3 \quad (12)$$

By the end of round 6: Node 2 can calculate the following in addition to all other calculations up to the end of round 5:

$$rtt((1,3) \to (2,i))=2(s_i^2[5]-(t_3^{\,1}[5]+ta((1,1) \to (2,1)))), \\ i=1,2,3 \quad (13)$$

$$\tilde{rtt}((2,3) \to (1,i))=2((s_i^{\,1}[6]+ta((1,1) \to (2,1))-\tilde{t}_3^{\,2}[6]))), \\ i=1,2,3 \quad (14)$$

In the above calculations, there are possibly multiple independent estimators for a single parameter, say v. However, once a precision estimator for v is available, the approximation estimator $\tilde{v}$ is ignored and only the values of all other precision estimators are calculated and used. For example, after round 2, only the approximate value of the $\tilde{rtt}((1,1) \to (2, i))$, i=1, 2, 3 may be calculated, hence they are valid at that point of time. By the end of round 3, the same calculation may be used to have approximate estimators for $\tilde{rtt}((1,1) \to (2, i))$, i=1, 2, 3. However, they are ignored due to the fact that precision estimators are then available for rtt(1,1)→(2, i), i=1, 2, 3. In fact, there are two different estimators available for rtt((1,1)→(2,1) and both of them are valid. The same trend happens for other distances between the pairs of antennas of the two nodes in the subsequent rounds.

It is to be noted in the above calculation the fact is used that the value of timing advance may be obtained between any pair of antennas, e.g., antenna i of node 1 and antenna j of node 2 as denoted by ta((1, i)→(2,j)). However, in theory the value should be invariant to which pair of antennas have been used for the calculation and in practice the error would be negligible.

When multiple estimators are available for an unknown parameter, the set of estimated values may be used instead of a single value in order to improve the accuracy of the system. For example, the mean of a set of estimators may be used which reduces the error variance of the estimators. Another example is filtering the outliers among the estimated values by considering the mean value.

Having the round trip estimation between pairs of antennas can also be used to filter out the outliers by considering the fact that the difference between the estimated values of the distance between an antenna in one node and two other antenna in the other node cannot be more than the distance between these two antenna that belong to the same node (triangle inequality).

Yet another use of having the distance estimator between multiple pairs of antennas that belong to a pair of nodes is estimating the relative orientations of the two nodes with respect to each other. This can be done in three dimensional space if each node has at least three antennas. As a result of finding the orientations of the two nodes with respect to each other, it is possible to unify their coordinate system. Hence, any estimated localization with respect to one node may be translated into the localization with respect to the other node. This means that if for example node 1 and node 2 have the unified coordinate, if the node 3 can be localized with respect to node 2, its location is also known with respect to node 1 even though it might not be even reachable from node 1.

Finally, it is noted that except for the value of the round trip time between the antenna 3 of node 1 and antenna 3 of node 2 which is given by an approximate value $\tilde{rtt}((2,3) \to (1,3))$, all other round trip times have precise calculations.

A description will now be given regarding localization, in accordance with an embodiment of the present invention.

Here, it is addressed localization of a node with respect to an origin node by using the combination of distance measurement and three dimensional angular calculation. It is shown that if the origin node is equipped with at least three antennas, it is generically possible to determine the coordinate of any node (even with single antenna) with respect to a coordinate system (say, e.g., in terms of distance, azimuth angle, and elevation angle) in the origin node. Hence, by adding multiple nodes to the system, the nodes are all localized with respect to the origin node.

We note that if some nodes are not reachable by an origin node, then the localization either needs multiple distance measurements with respect to other nodes, or we can exploit an intermediate node which is also equipped with at least three antennas. In this case, it is possible to find a unified coordinate system between such intermediate nodes and the origin. However, if the intermediate nodes are equipped with less than three antennas, they cannot find the orientation of the origin node or its coordinate system (i.e., rotation or reflection cannot be distinguished).

A description will now be given regarding an origin node equipped with three antennas, in accordance with an embodiment of the present invention.

Consider localization with respect to an origin node which has 3 antennas I=1, 2, 3. For abstraction, the antennas are modelled as points. There is a plane passing through the three points corresponding to the antennas which is called the node plane. The three points form a triangle. Denote the edge of the triangle opposite to the node i as $d_i$. Suppose that through a procedure we have measured the distance of the to be localized node, denoted by point 4, to the antennas i as $l_i$.

Find the volume V of the tetrahedron defined by the four points i=1, 2, 3, 4 as its vertices. The volume may be found directly based on $d_i$, $l_i$, i=1, 2, 3 by using the Cayley-Menger determinant given as follows:

$$288V^2 = \begin{bmatrix} 1 & 1 & 1 & 1 & 1 \\ 1 & 0 & d_3^2 & d_2^2 & l_1^2 \\ 1 & d_3^2 & 0 & d_1^2 & l_2^2 \\ 1 & d_2^2 & d_1^2 & 0 & l_3^2 \\ 1 & l_1^2 & l_2^2 & l_3^2 & 0 \end{bmatrix} \quad (15)$$

Let $A_{ijk}$ denote the area of a triangle with vertices i,j,k.

The area of the triangle based on its edges is given by, e.g., $A_{123}$ as follows:

$$A_{123} = \sqrt{p(p-d_1)(p-d_2)(p-d_3)}, p=(d_1+d_2+d_3)/2 \quad (15)$$

A coordinate system is defined as follows. Point 1 is chosen to be the original Point 2 is chosen to be in the x axis in the positive side. The z axis is chosen to be orthogonal to the plane of the node at the origin which also uniquely defines the direction of the y axis.

It is clear that based on measurements of $d_i$, $l_i$, i=1, 2, 3, there are always two possible solutions if we have only three points at the origin node and these two locations are the reflection of each other with respect to the plane of the origin node. To resolve such ambiguity, an extra antenna is needed at the origin node which is not located in the same plane as the other antennas. However, there is the possibility of using a polarized antenna to resolve such ambiguity by using only 3 antenna at the origin node.

In the following, localization is discussed of the point in one side of the plane of the origin node keeping in mind that the other solution exists as the reflection of this point with respect to the plane of the origin node. Hence, it is presumed that the node I located in positive values of the z axis.

The z coordinate of node 4, denotes by $z_4$, is equal to the following:

$$z_4 = \frac{V}{A_{123}} \quad (16)$$

The absolute value of the x coordinate of node 4, denoted by $x_4$, can be obtained as $|x_4| = \sqrt{l_1^2 - (A_{124}/d_3)^2}$. The sign of $x_4$ depends on the angle between two vectors $u_4$ and $u_2$ which are defined between the pair of nodes 4 and 1 and the pair of nodes 2 and 1, respectively. Let $\mathcal{A}(\beta)$ be a function which is equal to 1 when the angle $\beta$ belongs to $$\left[0, \frac{\pi}{2}\right]$$

and is equal to −1 when the angle beta belongs to $$\left[\frac{\pi}{2}, \pi\right].$$

The following is obtained:

$$x_4 = \mathcal{A}\left(\arccos \frac{l_1^2 + d_3^2 - l_2^2}{2l_i d_3}\right)\sqrt{l_1^2 - (A_{124}/d_3)^2} \quad (18)$$

The absolute value of the y coordinate of node 4, denoted by $y_4$, can be obtained as $$|y_4| = \sqrt{l_1^2 - \left(\frac{V}{A_{123}}\right)^2 - x_4^2}.$$

The sign of $x_4$ depends on the angle between two vectors $u_4$ and $u_3$ which are defined between the pair of nodes 4 and 1 and the pair of nodes 3 and 1, respectively. The following is obtained:

$$y_4 = \mathcal{A}\left(\arccos \frac{l_1^2 + d_2^2 - l_2^2}{2l_i d_2}\right)\sqrt{l_1^2 - (V/A_{123})^2} \quad (19)$$

The polar coordinate can be found based on the Cartesian coordinate of the vector $u_4=(x_4, y_4, z_4)$.

Figure 2:
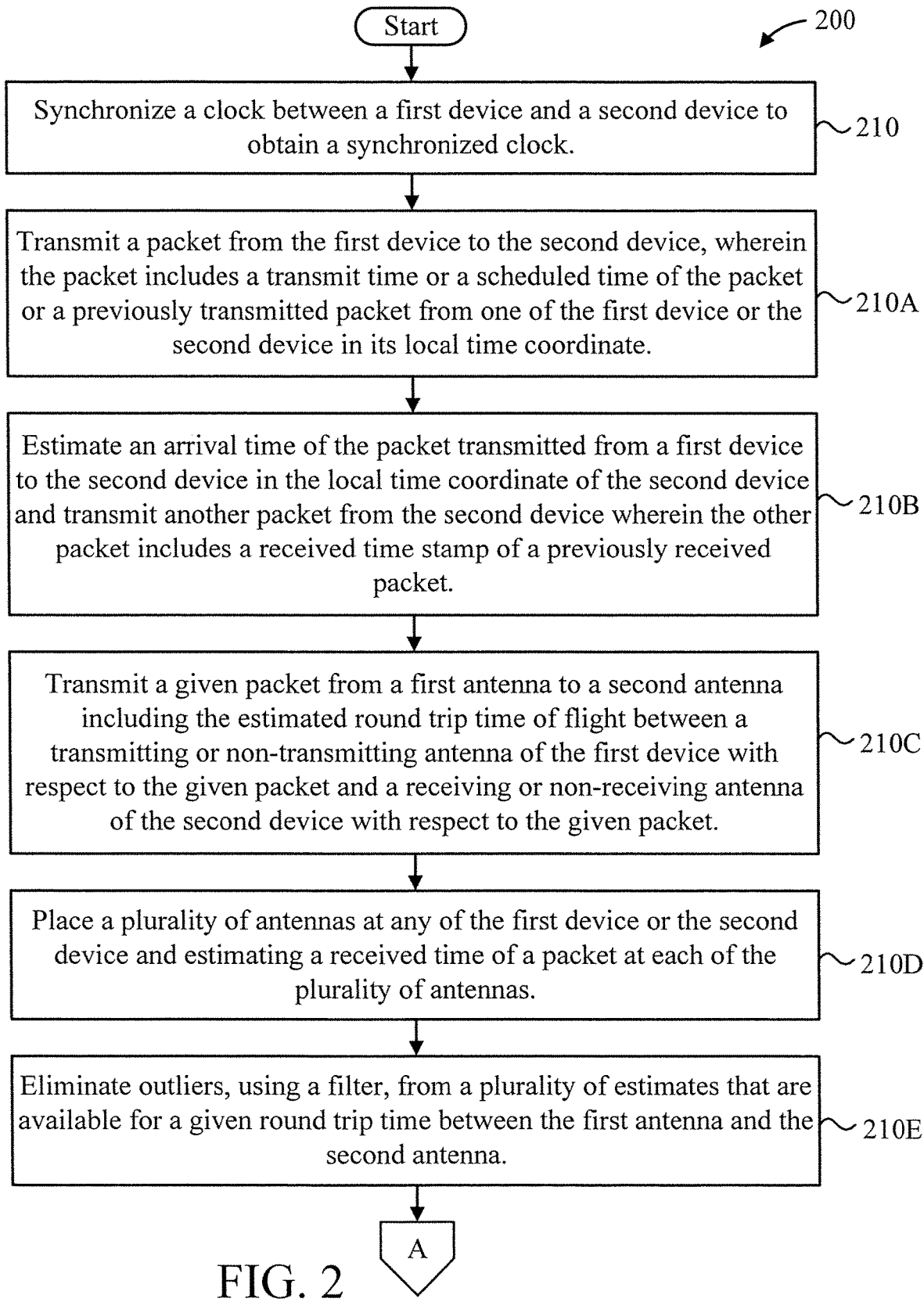
FIGS. 2-3 are flow diagrams showing an exemplary method for identifying device position, in accordance with an embodiment of the present invention.
Figure 3:
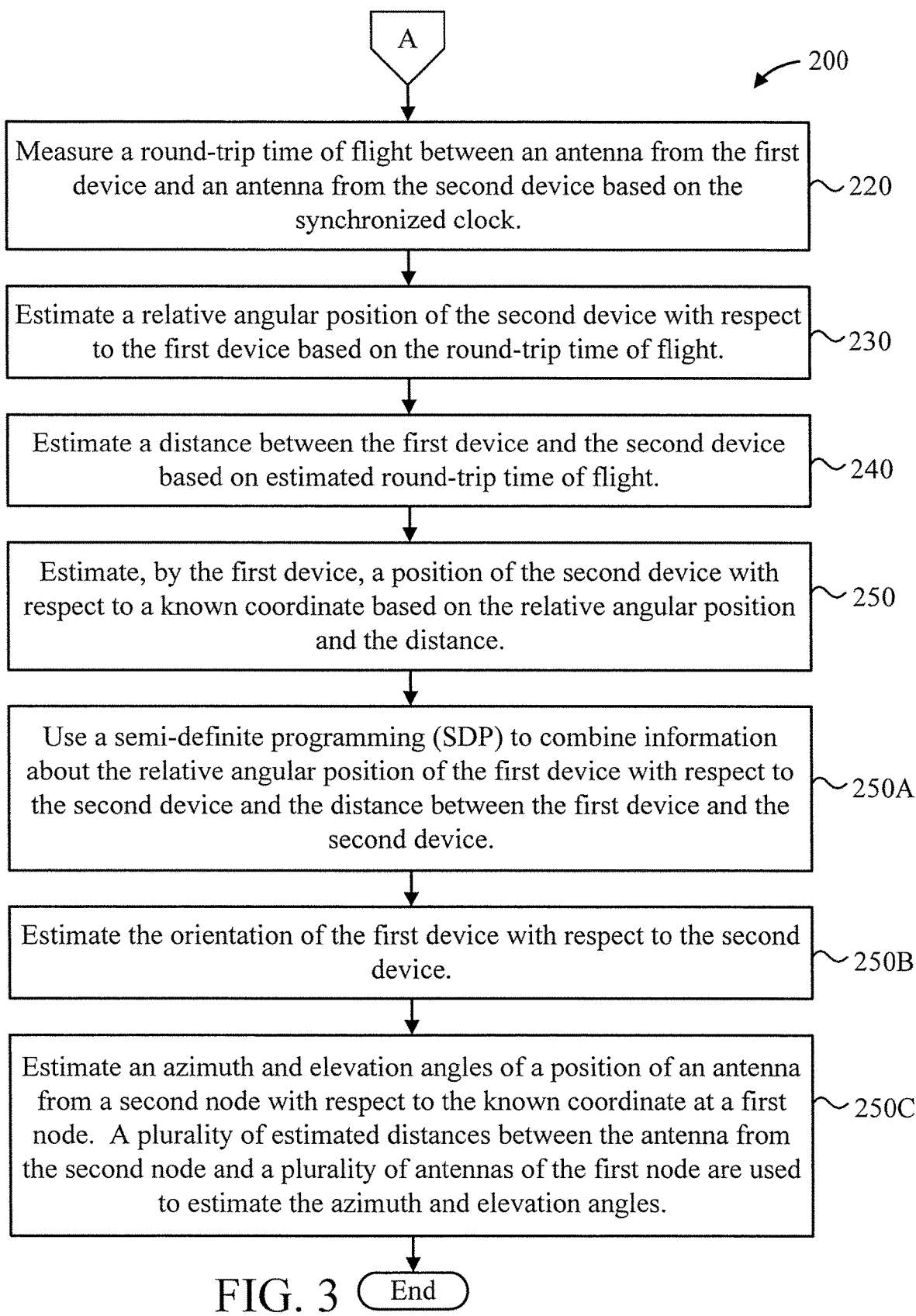

FIGS. 2-3 are flow diagrams showing an exemplary method 200 for identifying device position, in accordance with an embodiment of the present invention.

At block 210, synchronize a clock between a first device and a second device to obtain a synchronized clock.

In an embodiment, block 210 can include one or more of blocks 210A through 210E.

At block 210A, transmit a packet from the first device to the second device, wherein the packet includes a transmit time or a scheduled time of the packet or a previously transmitted packet from one of the first device or the second device in its local time coordinate.

At block 210B, estimate an arrival time of the packet transmitted from a first device to the second device in the local time coordinate of the second device and transmit another packet from the second device wherein the other packet includes a received time stamp of a previously received packet.

At block 210C, transmit a given packet from a first antenna to a second antenna including the estimated round trip time of flight between a transmitting or non-transmitting antenna of the first device with respect to the given packet and a receiving or non-receiving antenna of the second device with respect to the given packet.

At block 210D, place a plurality of antennas at any of the first device or the second device and estimating a received time of a packet at each of the plurality of antennas.

At block 210E, eliminate outliers, using a filter, from a plurality of estimates that are available for a given round trip time between the first antenna and the second antenna.

At block 220, measure a round-trip time of flight between an antenna from the first device and an antenna from the second device based on the synchronized clock.

At block 230, estimate a relative angular position of the second device with respect to the first device based on the round-trip time of flight.

At block 240, estimate a distance between the first device and the second device based on estimated round-trip time of flight.

At block 250, estimate, by the first device, a position of the second device with respect to a known coordinate based on the relative angular position and the distance.

In an embodiment, block 250 can include one or more of blocks 250A through 250C.

At block 250A, use a semi-definite programming (SDP) to combine information about the relative angular position of the first device with respect to the second device and the distance between the first device and the second device.

At block 250B, estimate the orientation of the first device with respect to the second device.

At block 250C, estimate an azimuth and elevation angles of a position of an antenna from a second node with respect to the known coordinate at a first node. A plurality of estimated distances between the antenna from the second node and a plurality of antennas of the first node are used to estimate the azimuth and elevation angles.

Figure 4:
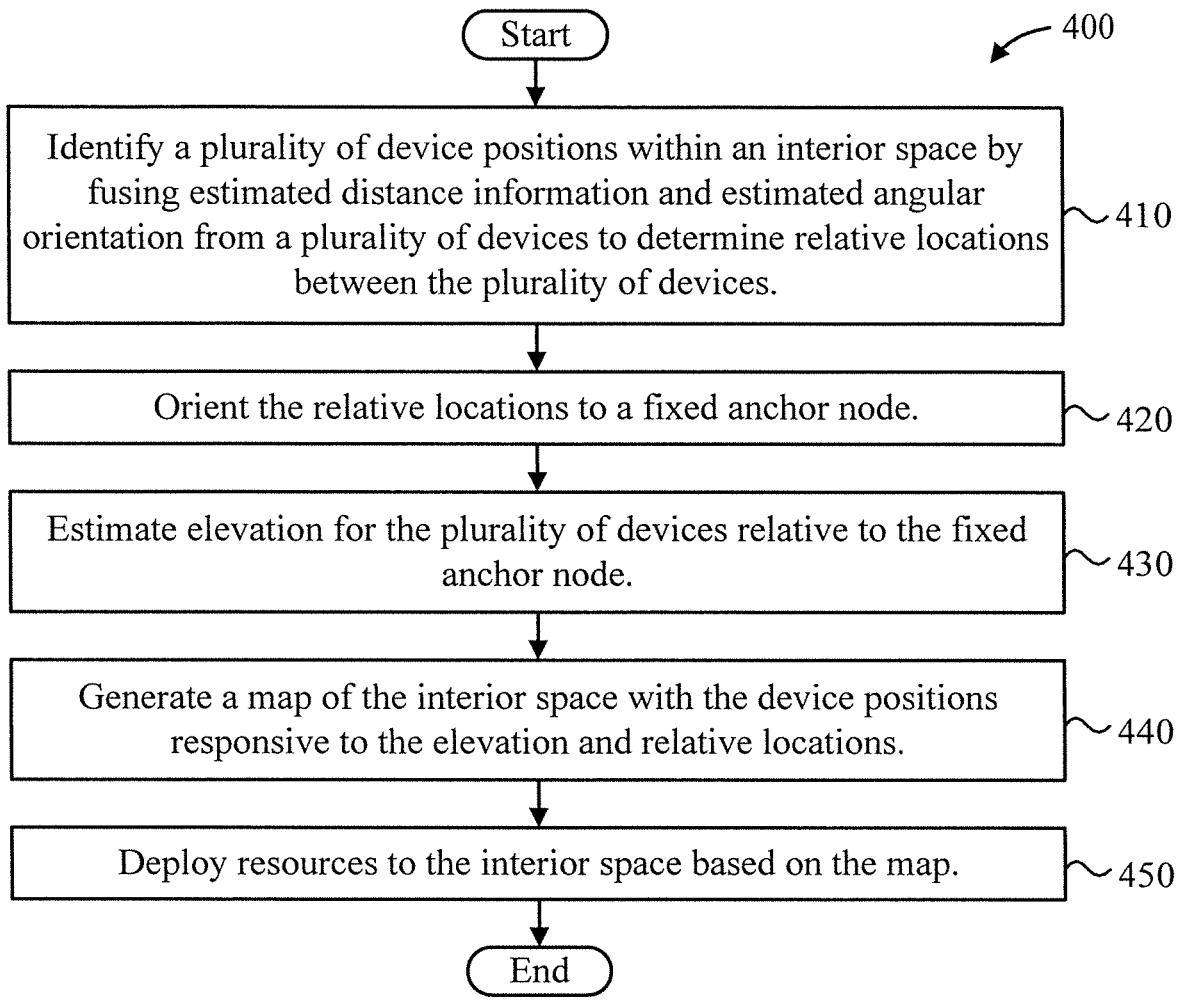
FIG. 4 is a flow diagram showing an exemplary method of deploying resources in an interior space, in accordance with an embodiment of the present invention.

FIG. 4 is a flow diagram showing an exemplary method 400 of deploying resources in an interior space, in accordance with an embodiment of the present invention.

At block 410, identify a plurality of device positions within an interior space by fusing estimated distance information and estimated angular orientation from a plurality of devices to determine relative locations between the plurality of devices.

At block 420, orient the relative locations to a fixed anchor node.

At block 430, estimate elevation for the plurality of devices relative to the fixed anchor node.

At block 440, generate a map of the interior space with the device positions responsive to the elevation and relative locations.

At block 450, deploy resources to the interior space based on the map.

Figure 5:
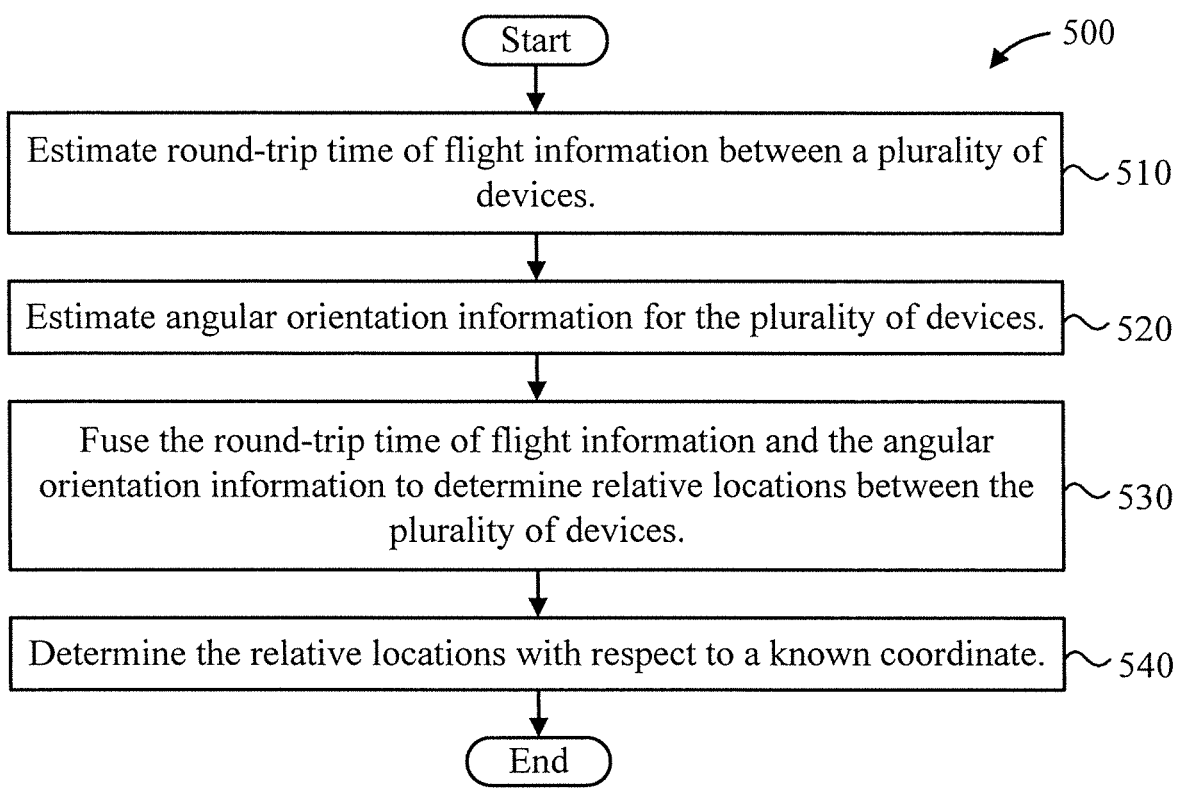
FIG. 5 is a flow diagram showing an exemplary method for identifying device positions, in accordance with an embodiment of the present invention.

FIG. 5 is a flow diagram showing an exemplary method 500 for identifying device positions, in accordance with an embodiment of the present invention.

At block 510, estimate round-trip time of flight information between a plurality of devices.

At block 520, estimate angular orientation information for the plurality of devices.

At block 530, fuse the round-trip time of flight information and the angular orientation information to determine relative locations between the plurality of devices.

At block 540, determine the relative locations with respect to a known coordinate.

Figure 6:
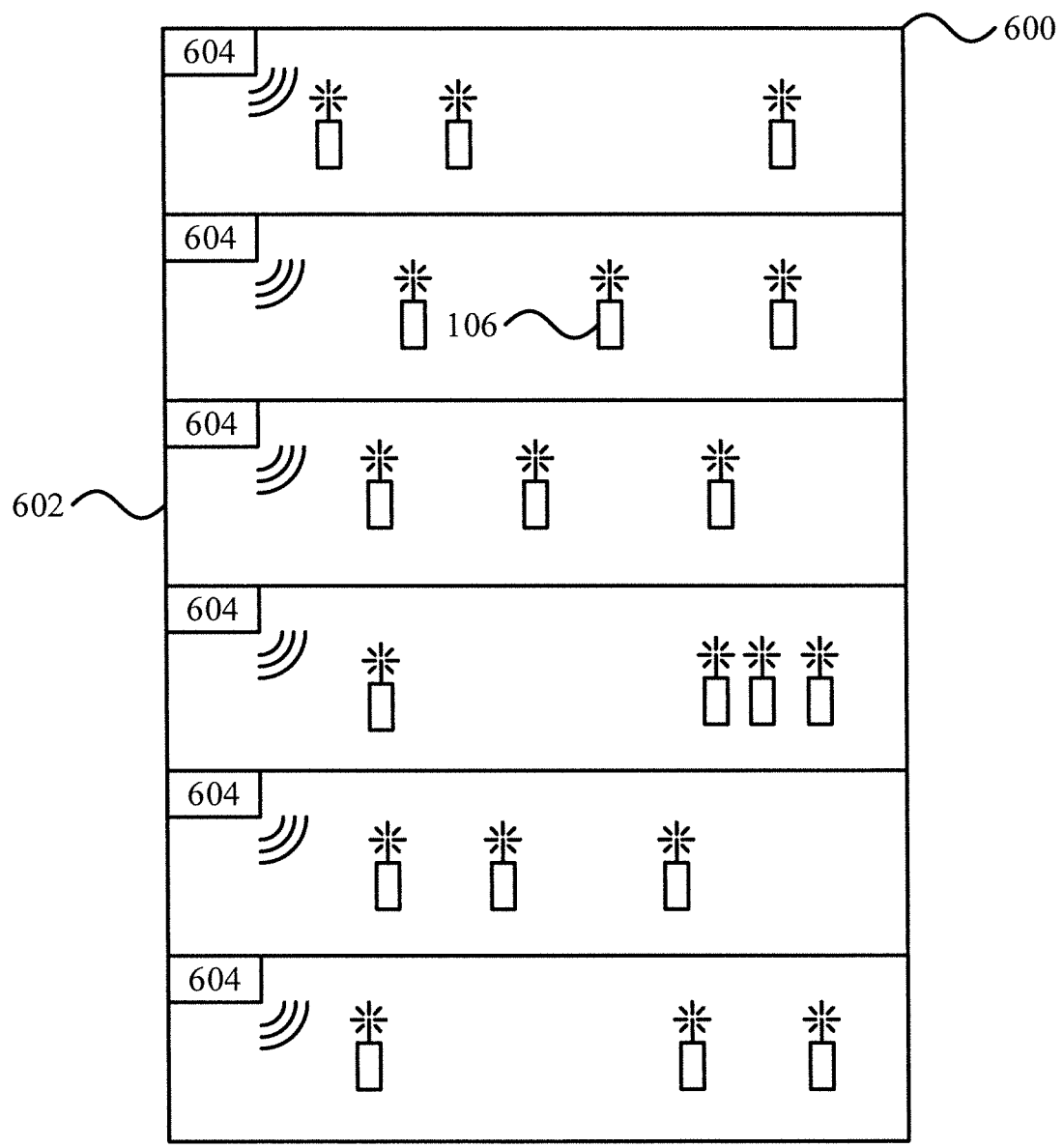
FIG. 6 is a block diagram showing localization of devices within a building 600, in accordance with an embodiment of the present invention.

FIG. 6 is a block diagram showing localization of devices within a building 600, in accordance with an embodiment of the present invention. The building includes a set of different floors 602. The internal configurations of the floors 602 are omitted for the sake of simplicity. On each floor, there is at least one anchor node 604. Each anchor node 604 may include an ultra-wide band transceiver that communicates with devices 606 in the building 600. During deployment, the real-world coordinates of each anchor node 604 may be determined.

The building 600 may be partially or entirely opaque to GPS signals, such that the devices 606 may not be able to reliably determine their positions in space using GPS information. The devices 606 may include any of a variety of different mobile electronic devices. For example, the devices 606 may include mobile telecommunication devices, such as cellphones, but the devices 606 may also include inventory tags or any other appropriate device. The devices 606 may each include an ultra-wide band transceiver.

Within each floor, the devices 606 may locate one another using the techniques described herein.

The anchor nodes 604 may have multiple antennas (e.g., more than three) and may be capable of estimating angle-of-arrival information. If anchor nodes 604 have only one antenna each, then multiple anchor nodes 604 may be positioned on each floor 602, at a sufficient distance from one another, to provide orientation.

Figure 7:
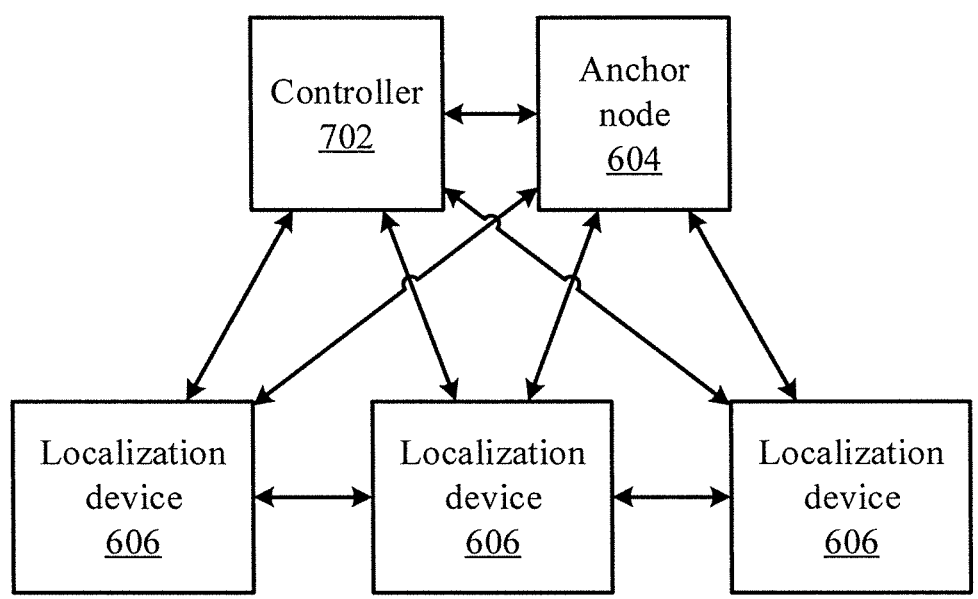
FIG. 7 is a block diagram showing communications between localization devices, an anchor node, and a controller, in accordance with an embodiment of the present invention.

FIG. 7 is a block diagram showing communications between the localization devices 606, the anchor node 604, and a controller 702.

These devices may communicate with one another by any appropriate wired or wireless communications medium and protocol. The localization devices 606 communicate with one another, for example by exchanging radio signal strength information that is used for determining ranges. The devices 606 communicate with the anchor node 604 for a similar purpose. Each device 606 and anchor node 604 communicates with a controller 602, which may be implemented as computing device 100. The controller 602 determines the positions of the devices 606 within the building 600 according to the methods described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for identifying a device position, comprising:
    synchronizing a clock between a first device and a second device to obtain a synchronized clock;
    measuring a round-trip time of flight between an antenna from the first device and an antenna from the second device based on the synchronized clock;
    estimating a relative angular position of the second device with respect to the first device based on the round-trip time of flight;
    estimating a distance between the first device and the second device based on estimated round-trip time of flight; and
    estimating, by the first device, a position of the second device with respect to a known coordinate based on the relative angular position and the distance.

2. The method of claim 1, wherein said synchronizing step comprises transmitting a packet from the first device to the second device, wherein the packet comprises a transmit time or a scheduled time of the packet or a previously transmitted packet from one of the first device or the second device in its local time coordinate.

3. The method of claim 2, further comprising estimating an arrival time of the packet transmitted from a first device to the second device in the local time coordinate of the second device and transmitting another packet from the second device wherein the other packet comprises a received time stamp of a previously received packet.

4. The method of claim 3, further comprising transmitting a given packet from a first antenna to a second antenna comprising the estimated round trip time of flight between a transmitting or non-transmitting antenna of the first device with respect to the given packet and a receiving or non-receiving antenna of the second device with respect to the given packet.

5. The method of claim 3, further comprising having a plurality of antennas at any of the first device or the second device and estimating a received time of a packet at each of the plurality of antennas.

6. The method of claim 5, wherein any of the first device and the second device transmit packets from different antennas thereof in a predetermined order.

7. The method of claim 4, wherein a filter is used to eliminate outliers from a plurality of estimates that are available for a given round trip time between the first antenna and the second antenna.

8. The method of claim 1, wherein a semi-definite programming (SDP) is used to combine information about the relative angular position of the first device with respect to the second device and the distance between the first device and the second device.

9. The method of claim 1, further comprising estimating an orientation of the first device with respect to the second device.

10. The method of claim 1, further comprising estimating an azimuth and elevation angles of a position of an antenna from a second node with respect to the known coordinate at a first node, wherein a plurality of estimated distances between the antenna from the second node and a plurality of antennas of the first node are used to estimate the azimuth and elevation angles.

11. The method of claim 1, further comprising deploying resources to the second device based on the position of the second device.

12. A system for identifying device positions, comprising:
a hardware processor; and
a memory that stores a computer program which, when executed by the hardware processor, causes the hardware processor to:
synchronize a clock between a first device and a second device to obtain a synchronized clock;
measure a round-trip time of flight between an antenna from the first device and an antenna from the second device based on the synchronized clock;
estimate a relative angular position of the second device with respect to the first device based on the round-trip time of flight;
estimate a distance between the first device and the second device based on estimated round-trip time of flight; and
estimate, by the first device, a position of the second device with respect to a known coordinate based on the relative angular position and the distance.

13. The system of claim 12, wherein the hardware processor synchronizes the clock by transmitting a packet from the first device to the second device, wherein the packet comprises a transmit time or a scheduled time of the packet or a previously transmitted packet from one of the first device or the second device in its local time coordinate.

14. The system of claim 13, wherein the hardware processor synchronizes the clock further by estimating an arrival time of the packet transmitted from a first device to the second device in the local time coordinate of the second device and transmitting another packet from the second device, wherein the other packet comprises a received time stamp of a previously received packet.

15. The system of claim 14, wherein the hardware processor synchronizes the clock additionally by transmitting a given packet from a first antenna to a second antenna comprising the estimated round trip time of flight between a transmitting or non-transmitting antenna of the first device with respect to the given packet and a receiving or non-receiving antenna of the second device with respect to the given packet.

16. The system of claim 14, further comprising a plurality of antennas at any of the first device or the second device, and wherein the hardware processor synchronizes the clock further by estimating a received time of a packet at each of the plurality of antennas.

17. The system of claim 16, wherein any of the first device and the second device transmit packets from different antennas thereof in a predetermined order.

18. The system of claim 15, further comprising a filter, implemented by the hardware processor, eliminating outliers from a plurality of estimates that are available for a given round trip time between the first antenna and the second antenna.

19. The system of claim 12, wherein the hardware processor deploys resources to the second device based on the position of the second device.

* * * * *